April 8, 1930.  G. F. ALTICE ET AL  1,753,545
ADJUSTING TOOL
Filed Dec. 22, 1927
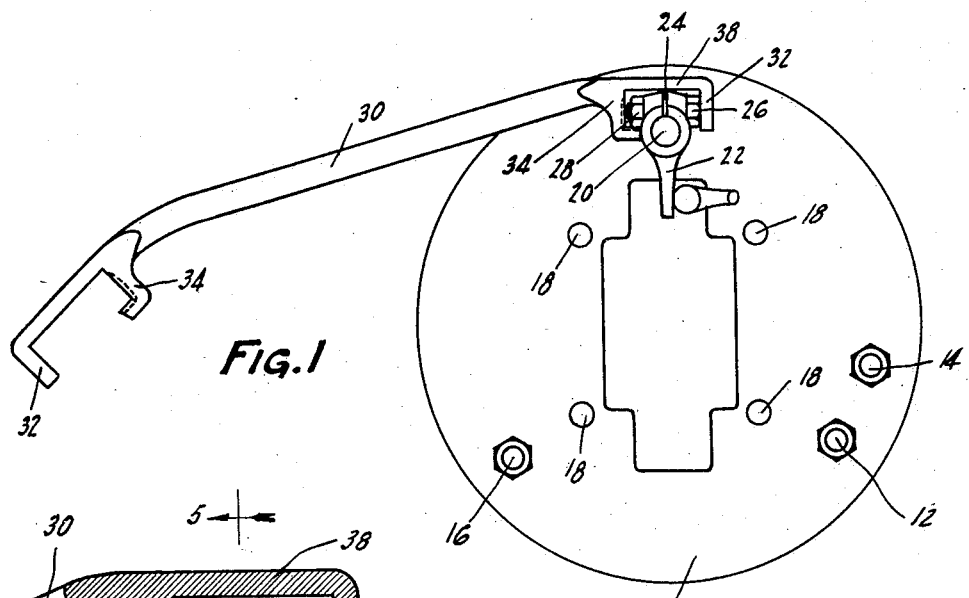
FIG.1
FIG.3
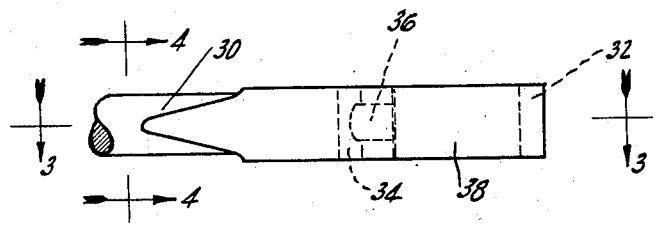
FIG.2
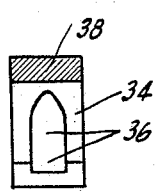
FIG.4
FIG.5
INVENTOR
GEORGE F. ALTICE
WILLIAM L. YOUNG
BY
M. W. McConkey
ATTORNEY Patented Apr. 8, 1930

1,753,545

UNITED STATES PATENT OFFICE

GEORGE F. ALTICE AND WILLIAM L. YOUNG, OF SOUTH BEND, INDIANA, ASSIGNORS, BY MESNE ASSIGNMENTS, TO BENDIX SERVICE CORPORATION, OF CHICAGO, ILLINOIS, A CORPORATION OF ILLINOIS

ADJUSTING TOOL

Application filed December 22, 1927. Serial No. 241,758.

This invention relates to the adjustment of brakes, and is illustrated as embodied in a tool for holding and turning the brake cam-shaft while the brake anchors are being adjusted, thus permitting the adjustment to be made by one man. In one desirable arrangement, the tool is in the form of a lever having two projections, preferably extending laterally from the lever adjacent its end and spaced apart to embrace a transverse clamping bolt for an operating arm on the camshaft. One of these projections extends across one end of the bolt, the other being hook-shaped and preferably formed with a socket to receive a head or nut on the opposite end of the bolt.

The above and other objects and features of the invention, including various novel and desirable details of construction, will be apparent from the following description of one illustrative embodiment shown in the accompanying drawing, in which:

Figure 1 is a side elevation of the tool, showing a brake assembly detached from the car and with the tool in place;

Figure 2 is a top plan view of the end of the tool;

Figure 3 is a section through the end of the tool on the line 3—3 of Figure 2;

Figure 4 is a section through the tool on the line 4—4 of Figure 2; and

Figure 5 is a section through the tool on the line 5—5 of Figure 3.

The brake assembly includes the usual backing plate 10, with the brake shoes mounted on the opposite side from that shown in the drawing. The adjustable pivots or anchors for the shoes are shown at 12 and 14, while an adjustable stop for one of the shoes is shown at 16. The openings 18 are for the bolts attaching the assembly to a front wheel knuckle. The cam-shaft of the brake is shown at 20, and has an operating arm 22 fixed thereon by a clamping bolt 24. This bolt has at one end a polygonal head 26 and at the other end a polygonal nut 28, ordinarily of the same size and shape as the head 26.

The brake assembly in itself forms no part of the present invention. The particular assembly illustrated is substantially as more fully illustrated and described in Patent No. 1,659,545, granted Bendix Brake Company on Feb. 14, 1928. The present invention has to do with a novel tool which is especially useful in adjusting the brake anchors 12 and 14, and which is designed for holding and turning the cam-shaft 20 or an equivalent brake-operating shaft.

In the arrangement illustrated, the tool comprises a lever 30, preferably having at its opposite ends two shaft-operating devices of different sizes. Each of these devices includes two laterally-extending projections 32 and 34, spaced apart to embrace a clamping bolt 24 for a shaft.

Projection 32 at the end of the lever is a straight flat projection which extends across the end of the clamping bolt, and which is illustrated as engaging the head 26. Projection 34 is hook-shaped, and preferably formed with a socket 36, to embrace the nut 28 (or the head 26, which is ordinarily the same size and shape as the nut). The part 38 of lever 30 between projections 32 and 34 may be flattened also.

In operation, the projections 32 and 34 are arranged to embrace the clamping bolt 24 of a brake, and the lever 30 is then operated to turn and hold the shaft 20 while the anchors 12 and 14 are being adjusted.

While one illustrative embodiment has been described in detail, it is not our intention to limit the scope of the invention to that particular embodiment, or otherwsie than by the terms of the appended claim.

We claim:

An adjusting tool adapted to embrace a transverse clamping bolt for an operating arm on a shaft, comprising a lever having two projections extending laterally on the same side of the lever, one being a flat and straight projection extending across one end of the clamping bolt, and the other being hook-shaped and formed with a socket to embrace a head or nut on the other end of the clamping bolt.

In testimony whereof, we have hereunto signed our names.

GEORGE F. ALTICE.
WILLIAM L. YOUNG.